United States Patent

Vowell

[11] Patent Number: 5,865,490
[45] Date of Patent: Feb. 2, 1999

[54] IMPACT SHOVEL

[76] Inventor: Jimmy D. Vowell, 9586 55th St., Riverside, Calif. 92509

[21] Appl. No.: 978,622

[22] Filed: Nov. 25, 1997

[51] Int. Cl.⁶ ................................. A01B 1/02; B25D 1/16
[52] U.S. Cl. .................................. 294/57; 294/49; 294/51
[58] Field of Search ............................ 294/49, 50.5–50.7, 294/51, 57–59; 29/275; 30/277, 367; 81/463; 125/40; 173/90, 91; 175/414; 172/18, 375

[56] References Cited

U.S. PATENT DOCUMENTS

| | | | |
|---|---|---|---|
| 263,038 | 8/1882 | Fleming | 294/50.5 |
| 1,530,225 | 3/1925 | Belakoy | 294/57 X |
| 2,529,342 | 11/1950 | Kopplin et al. | 294/57 |
| 5,040,614 | 8/1991 | Nash | 30/277 X |
| 5,370,192 | 12/1994 | Evinger | 173/90 |
| 5,461,900 | 10/1995 | Gutierrez | 81/463 X |

FOREIGN PATENT DOCUMENTS

| | | | |
|---|---|---|---|
| 180243 | 1/1907 | Germany | 294/49 |
| 3233025 | 10/1991 | Japan | 294/49 |

*Primary Examiner*—Johnny D. Cherry

[57] ABSTRACT

An impact shovel is provided comprising a lower extent and an upper extent. The upper extent is in slidable communication with the lower extent such that the upper extent may be extended and retracted with respect thereto. Further provided is a handle coupled to the upper extent. A shovel blade is coupled to the lower extent.

1 Claim, 2 Drawing Sheets

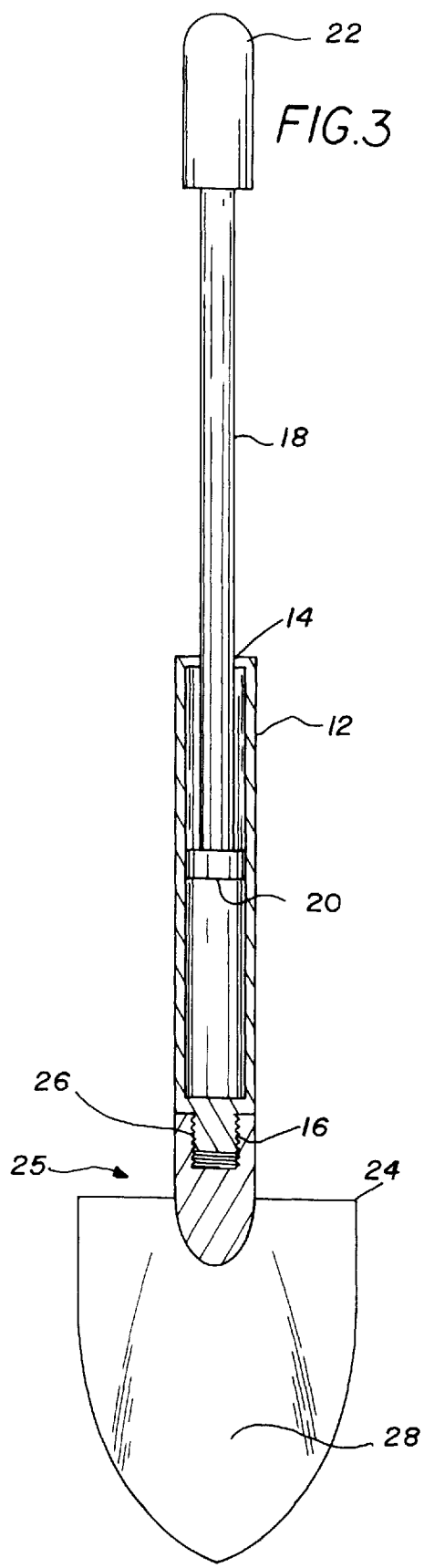
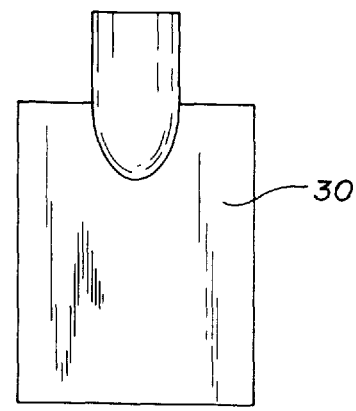
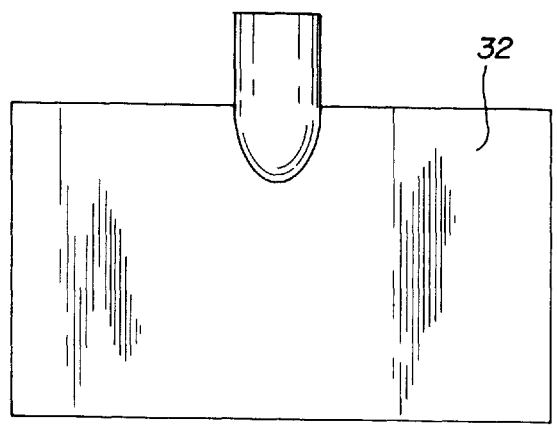

IMPACT SHOVEL

BACKGROUND OF THE INVENTION

1. Field of the Invention

The present invention relates to an impact shovel and more particularly pertains to inserting a blade of a shovel into earth which is hard to penetrate by the reciprocating motion of a handle of the shovel.

2. Description of the Prior Art

The use of shovels is known in the prior art. More specifically, shovels heretofore devised and utilized for the purpose of digging are known to consist basically of familiar, expected and obvious structural configurations, notwithstanding the myriad of designs encompassed by the crowded prior art which has been developed for the fulfillment of countless objectives and requirements.

By way of example, the prior art includes U.S. Pat. No. Des. 355,819; U.S. Pat. No. 5,085,281; U.S. Pat.No. 5,383, 696; U.S. Pat. No. 5,428,853; U.S. Pat. No. 4,335,493; and U.S. Pat. No. Des. 262,259.

In this respect, the impact shovel according to the present invention substantially departs from the conventional concepts and designs of the prior art, and in so doing provides an apparatus primarily developed for the purpose of inserting a blade of a shovel into earth which is hard to penetrate by the reciprocating motion of a handle of the shovel.

Therefore, it can be appreciated that there exists a continuing need for a new and improved impact shovel which can be used for inserting a blade of a shovel into earth which is hard to penetrate by the reciprocating motion of a handle of the shovel. In this regard, the present invention substantially fulfills this need.

SUMMARY OF THE INVENTION

In view of the foregoing disadvantages inherent in the known types of shovels now present in the prior art, the present invention provides an improved impact shovel. As such, the general purpose of the present invention, which will be described subsequently in greater detail, is to provide a new and improved impact shovel which has all the advantages of the prior art and none of the disadvantages.

To attain this, the present invention essentially comprises a hollow lower extent having a cylindrical configuration with a circular top face, a circular bottom face, and a tubular periphery formed therebetween defining an interior space. Note FIG. 3. The top face of the lower extent has an aperture of a first predetermined diameter. Further, the bottom face of the lower extent includes a post integrally coupled thereto with a plurality of threaded grooves formed therein. Next provided is a solid upper extent. Similar to the lower extent, the upper extent has a cylindrical configuration with a circular top face, a circular bottom face, and a tubular periphery formed therebetween. The bottom face of the upper extent has a disk-shaped member integrally coupled thereto in coaxial relationship therewith. It should be noted that the disk-shaped member has a second diameter that is greater than the first diameter. By this structure, the disk-shaped member is slidably situated within the interior space of the lower extent and the upper extent is slidably situated within the aperture of the lower extent. As such, the upper extent may be extended and retracted with respect to the lower extent. For gripping purposes, a handle is provided having a cylindrical configuration with a dome shaped top face and a flat bottom face integrally coupled to the top face of the upper extent. Also included is a plurality of removable blades each with an attachment mechanism. The attachment mechanism comprises a bore with a plurality of threaded grooves formed therein for releasably engaging the threaded grooves of the lower extent of the shovel. The removable blades include a first blade having an inboard linear extent and a pointed outboard extent. A second blade is included with a rectilinear configuration having side faces that are greater than inboard and outboard faces thereof. Note FIG. 4. Finally, a third blade is provided with a rectilinear configuration having side faces that are less than inboard and outboard faces thereof, as shown in FIG. 5.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved impact shovel which has all the advantages of the prior art shovels and none of the disadvantages.

It is another object of the present invention to provide a new and improved impact shovel which may be easily and efficiently manufactured and marketed.

It is a further object of the present invention to provide a new and improved impact shovel which is of a durable and reliable construction.

An even further object of the present invention is to provide a new and improved impact shovel which is susceptible of a low cost of manufacture with regard to both materials and labor, and which accordingly is then susceptible of low prices of sale to the consuming public, thereby making such impact shovel economically available to the buying public.

Still yet another object of the present invention is to provide a new and improved impact shovel which provides in the apparatuses and methods of the prior art some of the advantages thereof, while simultaneously overcoming some of the disadvantages normally associated therewith.

Still another object of the present invention is to insert a blade of a shovel into earth which is difficult to penetrate by the reciprocating motion of a handle of the shovel.

Lastly, it is an object of the present invention to provide a new and improved impact shovel comprising a lower extent and an upper extent. The upper extent is in slidable communication with the lower extent such that the upper extent may be extended and retracted with respect thereto. Further provided is a handle coupled to the upper extent. A shovel blade is coupled to the lower extent.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention with the first blade attachment.

FIG. 4 is a front view of the second blade attachment.

FIG. 5 is a front view of the third blade attachment.

Similar reference characters refer to similar parts throughout the several views of the drawings.

DESCRIPTION OF THE PREFERRED EMBODIMENT

Figure 1:
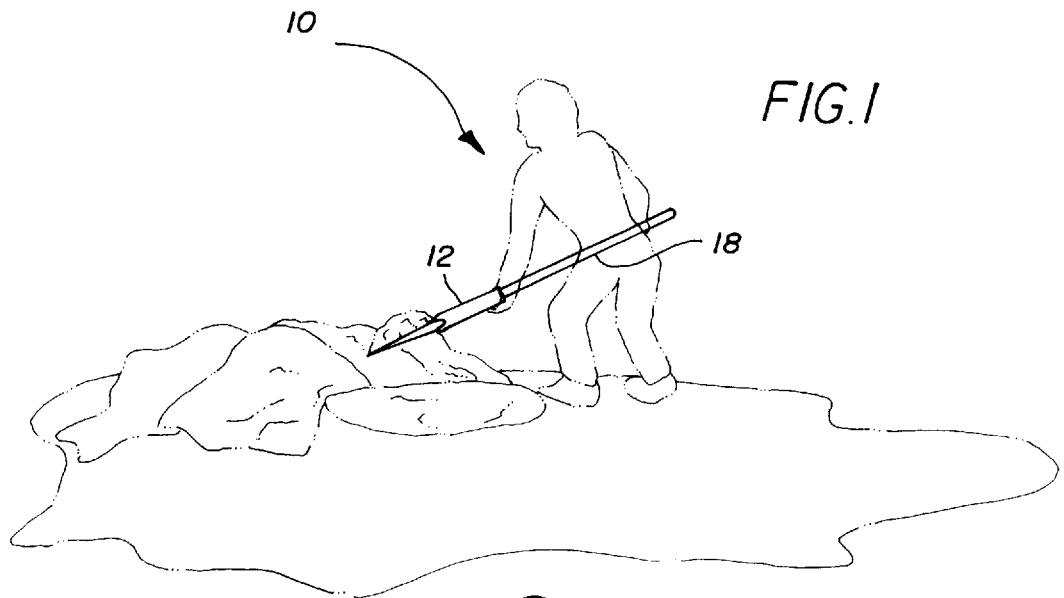
FIG. 1 is a perspective illustration of the preferred embodiment of the impact shovel constructed in accordance with the principles of the present invention.
Figure 2:
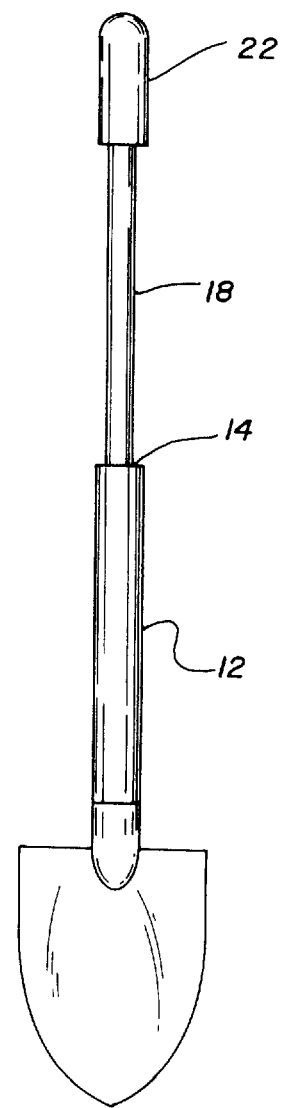
FIG. 2 is a front view of the present invention.

With reference now to the drawings, and in particular to FIG. 1 thereof, a new and improved impact shovel embodying the principles and concepts of the present invention and generally designated by the reference numeral 10 will be described.

The present invention, the new and improved impact shovel, is comprised of a plurality of components. Such components in their broadest context include a lower extent, an upper extent, a handle, and a plurality of removable blades. Such components are individually configured and correlated with respect to each other so as to attain the desired objective.

More specifically, it will be noted that the system 10 includes a hollow lower extent 12 having a cylindrical configuration with a circular top face, a circular bottom face, and a tubular periphery formed therebetween defining an interior space. It is preferred that such interior space extends nearly the entire length of the lower extent. Note FIG. 3. The top face of the lower extent has an aperture 14 of a first predetermined diameter. Further, the bottom face of the lower extent includes a post 16 integrally coupled thereto with a plurality of threaded grooves formed in an outer periphery thereof.

Next provided is a solid upper extent 18. Similar to the lower extent, the upper extent has a cylindrical configuration with a circular top face, a circular bottom face, and a tubular periphery formed therebetween. As shown in the Figures, the upper extent has a diameter that is less than that of the lower extent. Further, the length of the upper extent is approximately equal to that of the lower extent.

The bottom face of the upper extent has a disk-shaped member 20 integrally coupled thereto in coaxial relationship therewith. It should be noted that the disk-shaped member has a second diameter that is greater than the first diameter. By this structure, the disk-shaped member is slidably situated within the interior space of the lower extent and the upper extent is slidably situated within the aperture of the lower extent. As such, the upper extent may be extended and retracted with respect to the lower extent. This allows a user to strike the disk-shaped member against the bottom face of the lower extent in a reciprocating manner. Preferably, in the extended orientation, the upper and lower extents together have a length of 5 feet.

For gripping purposes, a handle 22 is provided having a cylindrical configuration with a dome shaped top face and a flat bottom face integrally coupled to the top face of the upper extent. The handle ideally constitutes less than ⅙ the length of the upper extent and has a diameter slightly larger than that of the upper extent. In the preferred embodiment, the cylindrical handle 22 is screwably coupled to the upper extent such that an unillustrated T-shaped handle may be employed at the discretion of the user.

Also included is a plurality of removable blades 24 each with an attachment mechanism 25. The attachment mechanism comprises a bore with a plurality of threaded grooves 26 formed therein for releasably engaging the threaded grooves of the lower extent of the shovel. As shown in Figures, the bore is formed in a tubular member that is integrally coupled to the associated blade. The removable blades include a dish-shaped first blade 28 having an inboard linear extent and a pointed outboard extent. A flat second blade 30 is included with a rectilinear configuration having side edges each of a length that is greater than that of the inboard and outboard edges thereof. Note FIG. 4. Finally, a flat third blade 32 is provided with a rectilinear configuration having side edges each of a length that is less than that of the inboard and outboard edges thereof, as shown in FIG. 5.

During use, the user may strike the disk-shaped member of the upper extent against the lower extent for the purpose of penetrating the blade into dense earth. As such, the user need not utilize his or her feet to strike an upper edge of the blade for digging purposes.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An impact shovel comprising, in combination:
   a hollow lower extent having a cylindrical configuration with a circular top face, a circular bottom face, and a tubular periphery formed therebetween defining an interior space, the top face of the lower extent having an aperture of a first predetermined diameter, the bottom face of the lower extent having a post integrally coupled thereto with a plurality of threaded grooves formed therein;

a solid upper extent having a cylindrical configuration with a circular top face, a circular bottom face, and a tubular periphery formed therebetween, the bottom face of the upper extent having a disk-shaped member integrally coupled thereto in coaxial relationship therewith, the disk-shaped member having a second diameter that is greater than the first diameter, whereby the disk-shaped member is slidably situated within the interior space of the lower extent and the upper extent is slidably situated within the aperture of the lower extent such that the upper extent may be extended and retracted with respect to the lower extent;

a handle having a cylindrical configuration with a dome shaped top face and a flat bottom face integrally coupled to the top face of the upper extent; and a plurality of removable blades each including an attachment mechanism comprising a bore with a plurality of threaded grooves formed therein for releasably engaging the threaded grooves of the lower extent of the shovel, the removable blades including a first blade having an inboard linear extent and a pointed outboard extent, a second blade with a rectilinear configuration having side edges each of a length that is greater than that of the inboard and outboard edges thereof, and a third blade with a rectilinear configuration having side edges each of a length that is less than that of the inboard and outboard edges thereof.

\* \* \* \* \*